United States Patent [19]

Leung et al.

[11] Patent Number: 5,597,142

[45] Date of Patent: Jan. 28, 1997

[54] SPACECRAFT ACQUISITION OF ORIENTATION BY SCAN OF EARTH SENSOR FIELD OF VIEW

[75] Inventors: Yat F. Leung, Redwood City; Scott W. Tilley, Belmont, both of Calif.

[73] Assignee: Space Systems/Loral, Inc., Palo Alto, Calif.

[21] Appl. No.: 398,981

[22] Filed: Mar. 6, 1995

[51] Int. Cl.$^6$ ..................................................... B64G 1/24
[52] U.S. Cl. ........................... 244/164; 244/165; 244/171
[58] Field of Search ............................... 244/158 R, 164, 244/165, 169, 170, 171, 172; 369/459, 455

[56] References Cited

U.S. PATENT DOCUMENTS

| | | | |
|---|---|---|---|
| 4,776,540 | 10/1988 | Westland | 244/164 |
| 5,080,307 | 1/1992 | Smay et al. | 244/164 |
| 5,132,910 | 7/1992 | Scheif et al. | 244/164 |

*Primary Examiner*—Galen L. Barefoot
*Attorney, Agent, or Firm*—Perman & Green

[57] ABSTRACT

A spacecraft orientation procedure, in accordance with a first embodiment of the invention, is practiced with a sun sensor to bring the x (roll) axis of the spacecraft parallel to a ray of the sun, and with a gyro sensor and an earth sensor of the spacecraft in conjunction with one instruction provided either autonomously or by a ground tracking station regarding an orientation of a spacecraft reference plane to enable locating the earth by the earth sensor. Furthermore, in accordance with a second embodiment of the invention, the orientation is established without aid from the ground tracking station by use of at least one telemetry and command antenna having a continuous field of view, as measured in one plane, which is greater than a semicircle. In the second embodiment, the orientation procedure provides for rotation of the spacecraft about the x axis for a scanning of the antenna to intercept command signals broadcast from the earth, thereby to locate the earth in a first reference plane. Rotation about the y (pitch) axis enables measurement of command signal strength for location of the earth in a second reference plane perpendicular to the first reference plane. Gyrocompassing establishes yaw in both embodiments of the invention.

4 Claims, 3 Drawing Sheets

SPACECRAFT ACQUISITION OF ORIENTATION BY SCAN OF EARTH SENSOR FIELD OF VIEW

BACKGROUND OF THE INVENTION

This invention relates to a procedure for acquiring orientation of a spacecraft relative to the earth during an encirclement of the earth by the spacecraft and, more particularly, in a first embodiment of the invention, to a procedure employing an alignment of a yaw axis of the spacecraft with the sun followed by a scanning movement of the spacecraft for sighting the earth by an earth sensor.

The orientation of a satellite, or spacecraft, encircling the earth is described in terms of a local coordinate system centered at the spacecraft and having three mutually perpendicular axes, namely, a yaw or z axis, a roll or x axis, and a pitch or y axis. In the case of a geosynchronous spacecraft traveling along an essentially circular orbit around the earth, and correctly oriented with the earth, the positive z axis points toward the center of the earth, and nominally, without yaw biasing, the positive x axis points in the direction of travel along the flight path of the spacecraft. The x, y and z axes form a right handed coordinate system.

In the performance of many types of missions, it is essential for the spacecraft to maintain its orientation relative to the earth during travel along a path encircling the earth. An example of such a mission is the generation of a sequence of photographs of the earth's cloud cover, wherein a displacement of certain cloud features among successive ones of the photographs would be indicative of cloud movement. The accuracy with which the cloud movement can be determined is dependent on the stability of the spacecraft orientation because any instability in the orientation would give a false reading of cloud displacement among the sequence of photographs. A further example of a mission requiring stable orientation arises in the case of a communications satellite wherein antenna radiation patterns are directed to specific geographical areas. A rotation of the spacecraft away from its desired orientation would offset an antenna radiation pattern from its designated geographical area resulting in degradation of the communication.

In the event that the spacecraft orientation becomes destabilized, it is important to reestablish the desired orientation rapidly. This is readily appreciated in the case of the communications mission wherein a lapse of several hours for reestablishing spacecraft orientation would create an unacceptable inconvenience to persons utilizing the communications function of the spacecraft. A problem arises in that with presently available procedures, the amount of time required to reestablish orientation is excessively long and that, furthermore, implementation of the procedures may require a significant amount of aid from a ground station which tracks the spacecraft. Preferably, the reorientation of the spacecraft should be accomplished with little or no aid from a ground tracking station.

SUMMARY OF THE INVENTION

The aforementioned problems are overcome and other advantages are provided by a spacecraft orientation procedure which, in accordance with a first embodiment of the invention, can be practiced with an earth sensor of the spacecraft in conjunction with one instruction provided either autonomously by on-board equipment, or by a ground tracking station regarding an orientation of a spacecraft reference plane to enable locating the earth by the earth sensor. Furthermore, in accordance with a second embodiment of the invention, the orientation can be established without aid from the ground tracking station by use of at least one telemetry and command (TC) antenna having a total field of view, as measured in one plane, which is greater than a semicircle. In the second embodiment, the orientation procedure provides for rotation of the spacecraft about the x axis for a scanning of the antenna to intercept command signals broadcast from the earth, thereby to locate the earth in a first reference plane. Rotation about the y (pitch) axis enables measurement of command signal strength for location of the earth in a second reference plane perpendicular to the first reference plane. Gyrocompassing establishes yaw in both embodiments of the invention.

The invention is to be described with reference to a specific configuration of spacecraft to facilitate explanation of the invention. By way of example, the spacecraft is a communications satellite encircling the earth in a circular, geosynchronous, generally equatorial orbit with no yaw bias. Two TC antennas with their associated electronic communication equipment are carried by the spacecraft to enable communication of control signals from ground stations to the spacecraft. One of the TC antennas is oriented in the positive z direction so as to face the earth, and the second of the telemetry antennas is oriented in the negative z direction to face away from the earth. The opposed orientations of the telemetry antennas, in concert with their relatively broad fields of view, enable ground control personnel to communicate with the spacecraft for all possible orientations of the spacecraft as might occur if the spacecraft were tumbling. The spacecraft is provided furthermore with an earth sensor which is oriented in the positive z direction for viewing the earth when the spacecraft has its desired orientation relative to the earth. A sun sensor is oriented in the negative x direction, and a gyro sensor assembly provides accumulated change in angular orientation of the spacecraft, including the three components of roll, pitch and yaw.

In the method for obtaining the desired orientation of the spacecraft, there are steps of pointing the sun sensor at the sun and then employing inertial rotations using a gyro to point the negative z axis toward the sun. This inertial rotation employs the gyro sensor assembly which has three gyro sensors disposed respectively on each of the x, y and z axes for indicating angular movement of the spacecraft during a reorientation of the spacecraft. In the practicing of these two steps, it is understood that the sun sensor is directed along the negative x axis, and that the earth sensor is directed along the positive z axis. In the practice of still further steps found in the second embodiment of the invention, it is understood that the TC antennas are oriented respectively in the positive and the negative z directions. Generally speaking, spacecraft are constructed in a variety of configurations corresponding to specific missions which are to be accomplished. In the event that one of the foregoing sensors or antennas were to be directed along a different axis than is disclosed in the foregoing example of spacecraft, then the procedure is to be modified accordingly. For example, if the the sun sensor were to point in the positive y direction, then sun acquisition would be accomplished initially by pointing the positive y axis toward the sun, after which gyrocompassing could be employed to reorient the spacecraft to bring the z axis in the desired orientation. Thus, the description of the method steps is based on the locations and/or orientations, relative to the body of the spacecraft, of the sensors and antennas used in practicing the method of the invention.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element in the different figures but may not be referenced in the description for all figures.

DETAILED DESCRIPTION

Figure 1:
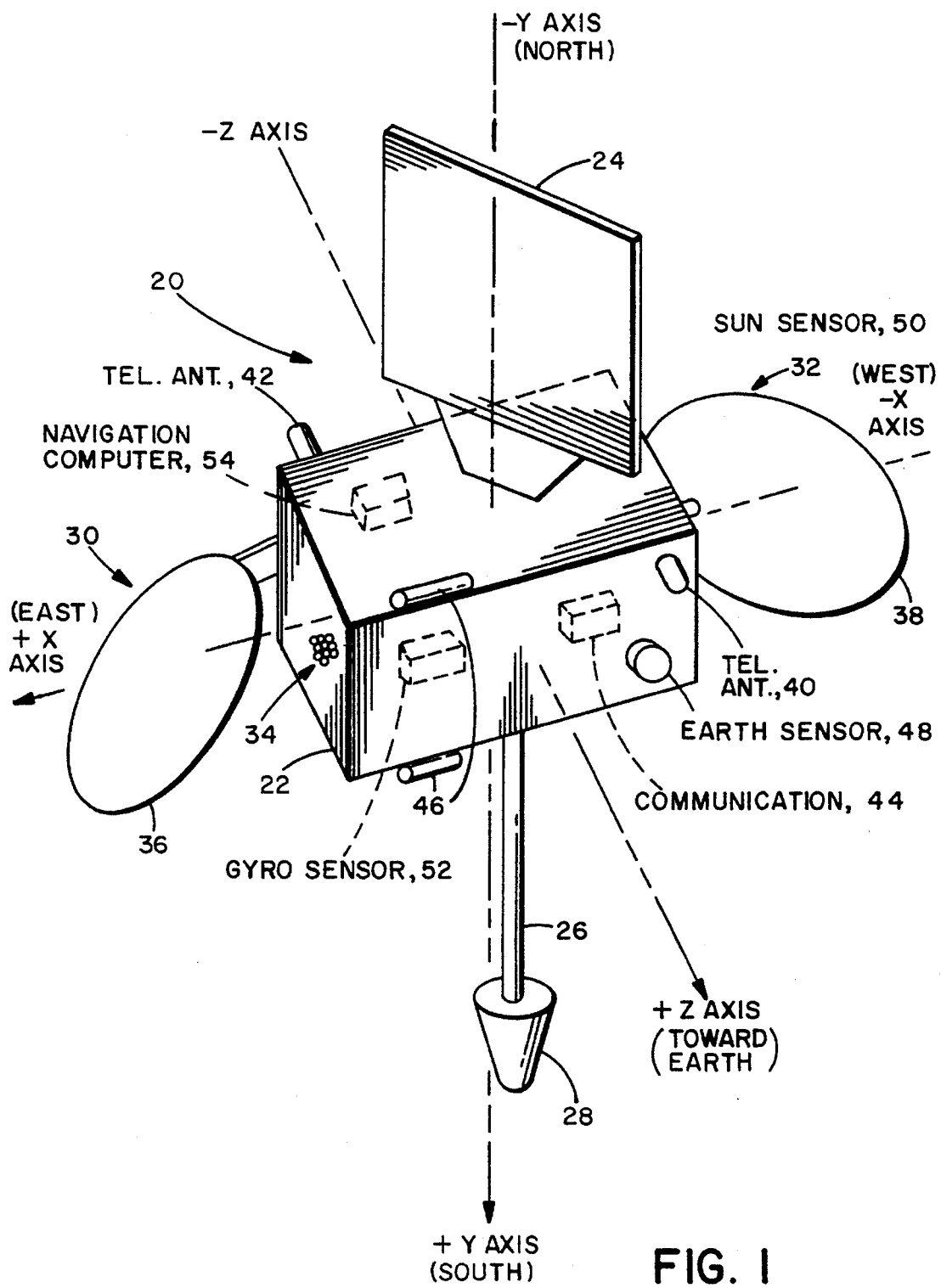
FIG. 1 shows a stylized view of a spacecraft encircling the earth and constructed with sensors and antennas useful in determining orientation of the spacecraft in accordance with the invention.
Figure 4:
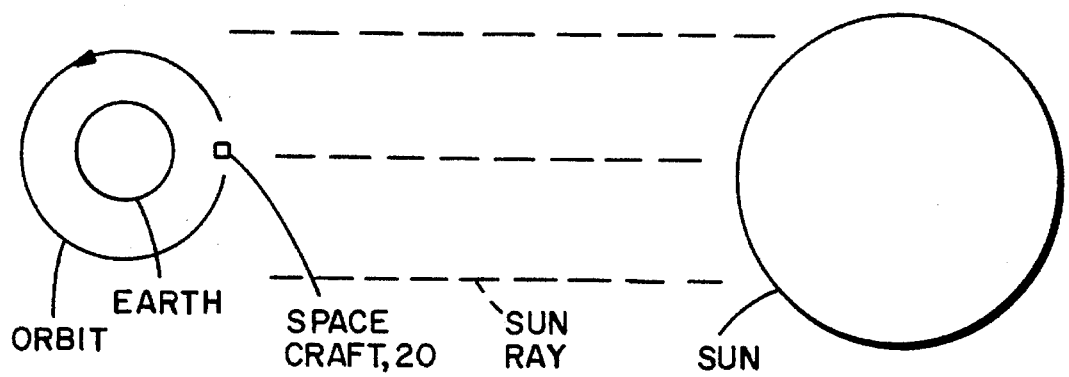
FIG. 4 is a diagram showing relative positions of the spacecraft, the earth, and the sun wherein the spacecraft is located between the earth and the sun.
Figure 5:
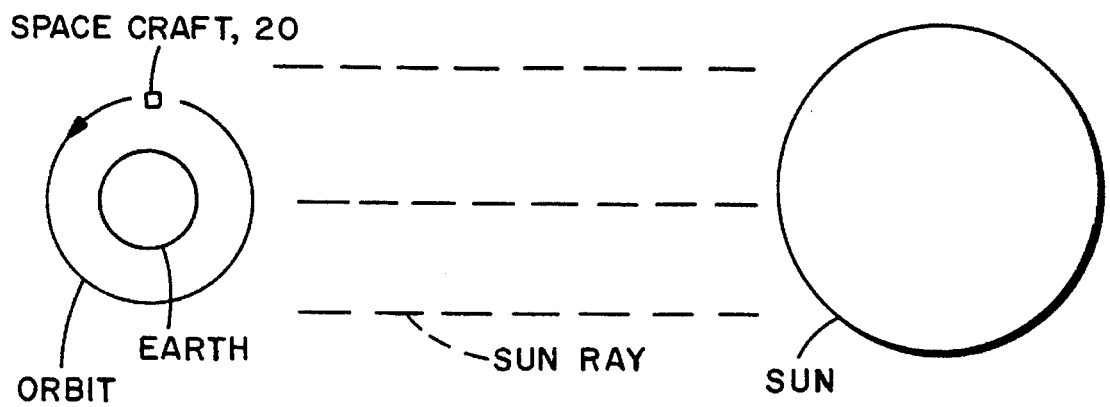
FIG. 5 is a diagram showing relative positions of the spacecraft, the earth, and the sun wherein the spacecraft has moved ninety degrees around the earth from the spacecraft location of FIG. 4.

With reference to FIG. 1, there is shown a spacecraft 20 traveling in a geosynchronous orbit about the earth (shown in FIGS. 4 and 5). A system of coordinate orthogonal axes, including x, y and z axes, extends from a body 22 of the spacecraft 20, and serves to identify orientations of components of the spacecraft 20 as well as various steps of rotation of the spacecraft 20 as will be described for the practice of the invention. A solar panel 24 (shown in FIG. 1) extends northerly from the body 22 along the negative y axis, and in the opposite direction, there extends from the body 22 a boom 26 carrying a solar sail 28 (shown In FIG. 1). The solar panel 24 has solar cells for converting solar energy to electric energy for powering electrical circuitry of the spacecraft. Two communication antennas 30 and 32 are disposed on opposite sides of the body 22, and operate in different frequency bands of a communication system with ground stations (not shown) located on the earth. Each of the antennas 30 and 32, by way of example, has a feed comprising an array of radiators, one such feed 34 being shown for the antenna 30. The antennas 30 and 32 comprise reflectors 36 and 38, respectively, for directing beams of radiation from their respective feeds in the positive z direction for signal transmission to and from the earth. It is noted that the directional identifications of north, south, east and west provided respectively for the axial directions identified as −y, +y, +x and −x apply only in the situation wherein the spacecraft 20 is properly oriented relative to the earth with the +z direction facing toward the earth and the −z direction facing away from the earth, preferably without yaw bias. The spacecraft 20 is traveling along its orbit in the easterly direction which is the direction of the +x axis.

In order to practice the invention, as well as for communication of command signals with ground stations for control of the spacecraft 20, the spacecraft 20 carries a first TC antenna 40 and a second TC antenna 42 electrically connecting with communication hardware, the TC antennas 40 and 42 extending from the body 22 respectively in the positive and the negative z directions. A set of well known thrusters, two of which are shown at 46 by way of example, are disposed on the body 22 for imparting rotations to the spacecraft 20 about any one or ones of the axes x, y and z to provide a desired orientation of the spacecraft 20. An earth sensor 48 views radiation from the earth for locating the earth, the sensor 48 being carried by the body 22 and facing in the +z direction. A sun sensor 50 views radiation from the sun for locating the sun, the sensor 50 being carried by the body 22 and facing in the −x direction. The spacecraft body 22 also carries a gyro sensor assembly 52 for providing data of incremental change of angular orientation of the spacecraft 20 to a navigation computer 54, also located in the body 22. The computer 54 outputs signals for control of the thrusters 46.

The gyro sensor assembly 52 is understood to comprise a set of sensors oriented along respective ones of the axes x, y and z for sensing angular rate of the spacecraft 20 about the respective axes. The gyro sensors may be mechanical or electromagnetic. It is preferable to employ a gyro sensor assembly including digital signal processing which provides for integration of sensed angular rates to output sampled data of accumulated angular increments between the output samples. Such a gyro sensor assembly may be referred to as a Digital Integrating Rate Assembly (DIRA). The DIRA provides the navigation computer 54 with an amount of rotation undergone by the spacecraft 20, with respect to all of the three axes x, y and z, during maneuvers of the spacecraft 20 undertaken in the practice of the invention, which maneuvers will be described hereinafter as procedural steps of the invention.

Figure 6:
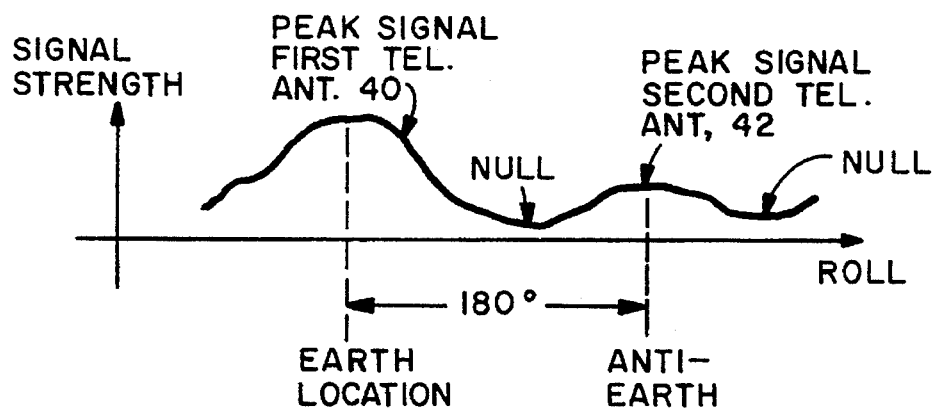
FIG. 6 is a graph showing one period of signal strength received by use of two opposed TC antennas of the spacecraft of FIG. 1 during rotation of the spacecraft about its roll axis.

The TC antennas 40 and 42 are used, as disclosed above, for communication of command signals, and are used furthermore, in accordance with a feature of one embodiment of the invention, for sensing the presence of command signals to indicate the presence of the earth, much in the same manner as the operation of the earth sensor 48 for locating the earth. This is accomplished by rotating the spacecraft 20 about the x axis, and also about the y axis, after suitably positioning the spacecraft in a manner to be described. Upon a positioning of the spacecraft 20 such that the foregoing rotation can bring the radiated command signals from the earth into the fields of view of the TC antennas 40 and 42, there is obtained a periodic pulsation in received signal amplitude at each of the antennas 40, 42. One period of the pulsation in signal strength received by use of both of the TC antennas 40 and 42 is shown in FIG. 6 for the case of rotation of the spacecraft 20 about the roll axis. Peak amplitude or a centroid of the received signal pulsation serves as an indication of the location of the earth. Such a detection can be accomplished even with a single one of the TC antennas 40, 42, but is accomplished preferably by use of both of the TC antennas 40 and 42. In the case of the use of both antennas 40 and 42, nulls in the amplitude of the detected signal pattern also provide data for the location of the earth. While two peaks are shown in the graph of FIG. 6, it should be noted that, under certain circumstances depending on the specific configuration of the field of view of the antenna 42, it is possible to obtain only one peak. Rotation of the spacecraft 20 about the x axis provides earth location data referenced to the x-z plane, while rotation of the spacecraft 20 about the y axis provides earth location data referenced to the y-z plane. This detection of the earth's location is sufficiently accurate to allow the spacecraft 20 to be rotated to face the earth such that the earth sensor 48 can view the earth. The earth sensor 48 is employed then to enable a further rotation and accurate alignment of the spacecraft 20 with the earth.

Figure 3:
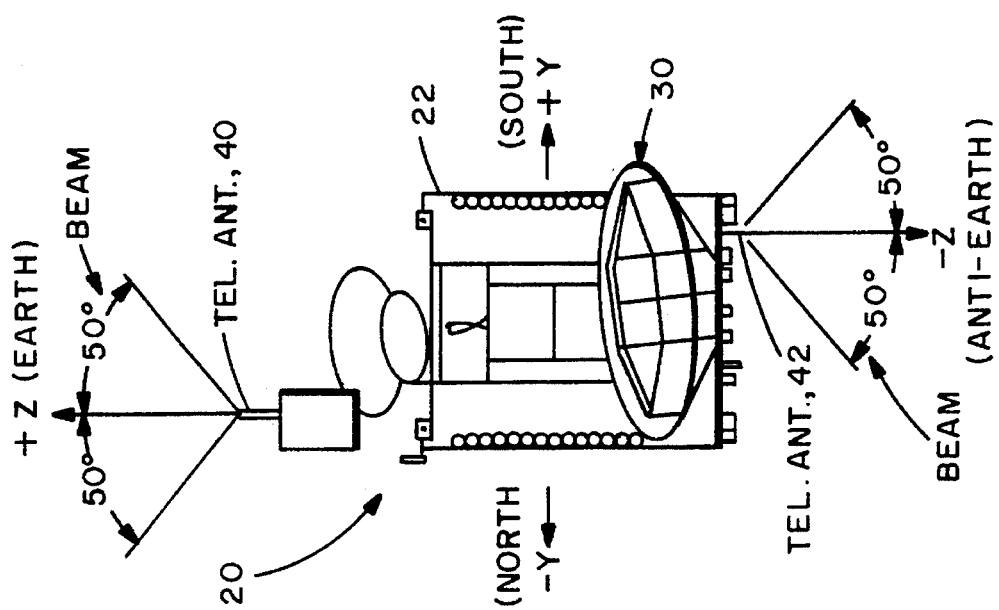
FIG. 3 is a side view, partially diagrammatic, of the body of the spacecraft of FIG. 1 showing beam radiation patterns (fields of view) of the TC antennas carried by the spacecraft.
Figure 2:
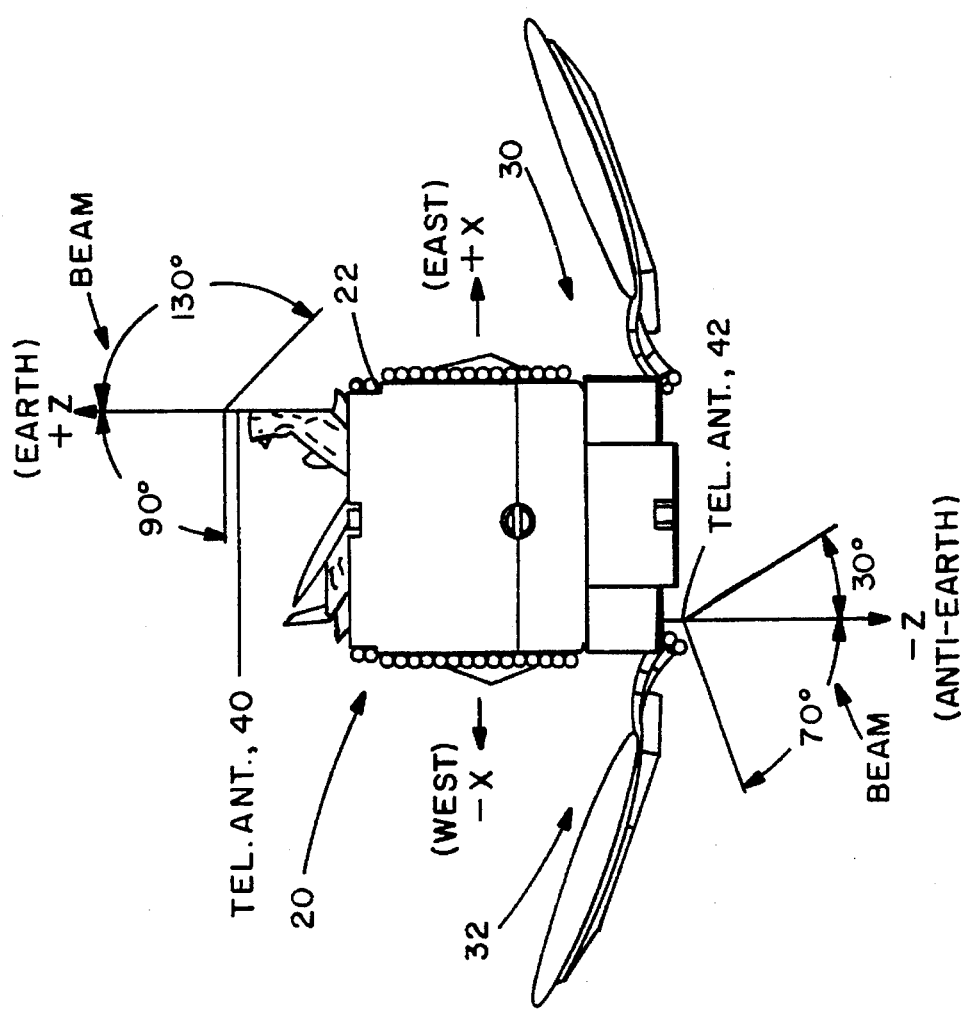
FIG. 2 is a top view, partially diagrammatic, of a body of the spacecraft of FIG. 1 showing beam radiation patterns (fields of view) of TC antennas carried by the spacecraft.

FIGS. 2 and 3 show radiation patterns of the TC antennas 40 and 42. In order to guarantee a sensing of earth presence in one roll of rotation of the spacecraft, the TC antenna 40 has a field of view in excess of 180 degrees as measured in the x-z plane presented in FIG. 2. A combination of TC antennas with overlapping fields of view greater than 180 degrees may also be used. If this condition is not met, then detection of the earth may be delayed due to the spacecraft's position in the orbit. In the y-z plane, the field of view of the antenna 40 is 100 degrees, the being the same width of the field of view of the antenna 42 as measured in both the x-z and the y-z planes. Beam orientations relative to the z axis, as well as the fields of view, are shown in FIGS. 2 and 3. In the y-z plane of FIG. 3, the fields of view of the antennas 40, 42 are symmetrical relative to the z axis; however, in the x-z plane of FIG. 2, the fields of view of the antennas 40, 42 are angled outwardly toward opposite sides of the spacecraft body 22. These configurations and orientations of the fields of view of the antennas 40 and 42 enable the antennas 40 and 42 to be employed in the dual roles of telemetry/command communication and earth position sensing.

In both FIGS. 4 and 5, rays of light from the sun are disposed parallel to each other, and illuminate the earth as well as the spacecraft 20 in various positions along the spacecraft orbit. In FIG. 4, the space craft 20 is directly in line with the earth and the sun, and located between the earth and the sun. In FIG. 5 the spacecraft 20 has advance along its orbit in an arc of 90 degrees. It is noted that in the passage of the spacecraft 20 along its orbital path, the spacecraft 20 may rotate such as to maintain its z axis pointing toward the center of the earth or, alternatively as in a sun-acquisition mode, the x axis may be kept parallel to an initial reference orientation as the spacecraft 20 progresses about its orbital path. These forms of travel will be discussed in the practice of the method steps of the embodiments of the invention, to be described in the following methodology. The methodology for regaining spacecraft orientation is to be provided in the situation wherein the spacecraft 20 has lost its orientation to such an extent that the earth is no longer in the field of view of the earth sensor 48, and is applicable even in situations where one of the coordinate axes is reversed in direction.

In the first embodiment of the invention, the method of orienting the spacecraft 20 begins with a sun acquisition step in which the spacecraft 20 is rotated about the y and/or the z axis to bring the sun into the field of view of the sun sensor 50. The sun sensor which has, in a typical form of construction, a photocell detector able to generate signals which locate the sun relative to the sun sensor 50. These signals of the sun sensor 50 are employed by spacecraft control electronics of the navigation computer 54 to point the spacecraft 20 accurately towards the sun. Since the sun sensor 50 is directed along the negative x direction, the −x axis points toward the sun at the conclusion of the sun acquisition step. Again, it is emphasized that this description is based on the spacecraft configuration of FIG. 1. For example, if the sun sensor were oriented along the −y direction in some other spacecraft configuration (not shown), then the this step of the method would be accomplished by rotation of the spacecraft 20 about the x and/or z axes resulting in a pointing of the −y axis toward the sun. It is to be understood, therefore, that in the practice of the invention, the designated axes of rotation of the spacecraft 20 are to be altered to conform to the specific orientations of sensors which may be present upon spacecraft having configurations different from the present spacecraft 20.

The method continues by commanding zero rotational rates in roll, pitch and yaw. These commands are issued by either the ground controllers via the TC antenna 40, 42 to the navigation computer 54, or autonomously by the navigation computer itself. It is understood in the practice of this embodiment of the invention that the ground personnel can command the spacecraft 20 at any point in the spacecraft orbit and that, furthermore, the ground station or the onboard navigation computer 54 can determine the spacecraft position with respect to the earth and the sun at any point in the spacecraft orbit.

The next step involves use of the gyro sensor 52 (the DIRA) for imparting a rotation of the spacecraft 20 about the y axis through an angle of 90 degrees in the x-z plane to align the z axis with the sun by pointing the −z axis toward the sun. In the foregoing steps it has been presumed that the spacecraft 20 is located between, or approximately between, the earth and the sun as in FIG. 4. However, if the spacecraft 20 is located such that the earth is between the spacecraft 20 and the sun, then the foregoing step would be modified so that the +z axis is to be pointed toward the sun. The foregoing steps of the procedure are to be performed only when the spacecraft 20 is within +/−45 degrees of the sun/earth line. When the spacecraft 20 is outside these roughly "colinear" regions of space, it is not necessary to perform the foregoing steps since the earth sensor, in conjunction with biasing the sun sensor, shall already detect the earth within one roll of rotation of the spacecraft.

In the following step, use is made of the sun line, a vector extending from the spacecraft toward the sun, the vector being parallel to a sun ray shown in FIGS. 4 and 5. A further vector, the earth vector, extends from the spacecraft to the earth. The step is accomplished by rotating the y axis of the spacecraft to bring the magnitude of the included angle between the spacecraft z axis and the sun line to equal the magnitude of the included angle between the earth vector and the sun line.

An off-axis spin of the spacecraft 20 is provided in the next step by rotating the spacecraft 20 about a vector extending to the sun from the center of the xyz coordinate system in the spacecraft body 22. The off-axis spin is accomplished by use of position and rate information provided by the DIRA. Due to the geometry of the off-axis spin, this procedure of orienting the spacecraft 20 may be referred to as the cone earth acquisition procedure. The off-axis spin has the effect of moving the earth sensor 48 through an arc which brings the earth into the field of view of the earth sensor 48. Once the earth is in the field of view of the earth sensor 48, the spacecraft 20 is rotated about the x and the y axes using information from the earth sensor, this constituting roll and pitch maneuvers, to center the earth in the field of view of the earth sensor 48 and thereby acquire the earth by the earth sensor 48. The z axis is now pointing at the center of the earth. Gyrocompassing is then employed to estimate a yaw error based on earth sensor and DIRA measurements to perform a yaw maneuver to point the x and the y axes in their correct east-west and north-south directions.

In the second embodiment of the invention, the method of orienting the spacecraft 20 by use of the TC antennas 40, 42 is accomplished in the following manner. This procedure may be referred to as the antenna assisted earth acquisition procedure. The spacecraft x axis may be facing the sun as in the first embodiment of the invention, by this is not a requirement of the second embodiment of the invention. This embodiment of the invention requires only the DIRA for attitude sensing in order to maneuver the spacecraft so that its +z axis is pointed toward the earth, regardless of the initial spacecraft orientation.

As has been described with reference to FIG. 1, the TC antennas 40, 42 face outwardly from the x-y plane and, therefore, may be rotated through an arc for viewing command signals emanating from an earth station by rotation of the spacecraft 20 in roll about the x axis or in pitch about the y axis. For purposes of the practice of the method of orientation of the spacecraft 20, the viewing of the command signals by the TC antennas 40, 42 may be regarded as a viewing of the earth, much in a manner analogous to the operation of the earth sensor 48 in viewing the earth by detection of infrared radiation emanating from the earth.

The method continues with a step of rolling the spacecraft 20 about the x axis. As the spacecraft 20 rolls, command signals are received by the antennas 40, 42 with signal strength that varies as a function of the roll angle as has been described above with reference to FIG. 6. A history of the signal strength is stored in a memory (not shown) of the electronic circuitry, such as the communication circuitry 44 or the navigation computer 54, of the spacecraft 20 as a function of the roll angle. The roll angle is provided by the DIRA. As described above, the peak signal strengths of signals received by the two TC antennas 40, 42 may be employed to give earth location in terms of roll angle. The spacecraft 20 is then rotated about the x axis to the roll coordinate of the earth's location to place the earth in the x-z plane. The next step is to rotate the spacecraft 20 about the y axis, this being a pitch maneuver, to obtain a further history of command signal strength as a function of pitch angle, the pitch angle being provided by the DIRA. Again, the locations of signal peaks may be employed, as described above, to locate the earth in the pitch coordinate. The spacecraft 20 is then rotated about the y axis to the pitch coordinate of the earth's location to place the earth in the y-z plane.

At this point in the procedure, the earth is located in or approximately in each of the x-z and the y-z planes. The locating of the earth in each of these planes may be only approximate because the signal histories of FIG. 6 provide a measurement which is not as accurate as that obtained by the earth sensor 48. The intersection of these the x-z and the y-z planes is the z axis which, therefore, points at or approximately at the earth. The accuracy of the pointing of the z axis should be adequate to bring the earth into the field of view of the earth sensor 48. However, in the event that the pointing of the z axis is not accurate enough to bring the earth into the field of view of the earth sensor 48, the the steps of rolling and pitching the spacecraft 20 can be repeated to obtain more accurate measurements of the location coordinates of the earth in terms of the x-z and the y-z planes. The resulting pointing of the z axis is then sufficiently accurate to bring the earth into the field of view of the earth sensor 48.

Once the earth is in the field of view of the earth sensor 48, the spacecraft 20 is rotated about the x and the y axes using information from the earth sensor, this constituting roll and pitch maneuvers, to center the earth in the field of view of the earth sensor 48. The z axis is now pointing at the center of the earth. Gyrocompassing is then employed during a yaw maneuver to point the x and the y axes in their correct east-west and north-south directions. Thereby, the second embodiment of the method of the invention has also accomplished the desired orientation of the satellite, but without aid from the ground station, and without need for performing the off-axis spin.

In each of the embodiments of the invention, it is noted that during performance of the respective sequences of method steps, the earth may enter the field of view of the earth sensor during any step of the sequence of steps. If this occurs, the computer 54 terminates the sequence of steps, and directs the spacecraft to perform roll and pitch maneuvers based on the earth sensor data, thereby to center the +z axis on the earth. Gyrocompassing can then be employed to estimate yaw error based on earth sensor and gyro measurements to perform a yaw maneuver to point the x and y axes in their correct east-west and north-south directions.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A method of orienting a spacecraft relative to the earth with the aid of the sun during an orbiting of the earth by the spacecraft, the spacecraft being describable in terms of a local coordinate system having an x axis and a y axis and a z axis which are mutually perpendicular, the positive direction of the z axis facing the earth upon completion of an orientation of the spacecraft, the spacecraft having an earth sensor facing in the positive z direction, the spacecraft having a sun sensor facing in the negative x direction wherein the x axis is the roll axis and the y axis is the pitch axis, there being an earth vector extending from the spacecraft to the earth and a sun line vector extending from spacecraft to the sun, the spacecraft carrying a gyro sensor assembly outputting angle increment during a rotation of the spacecraft and enabling an inertial rotation of the spacecraft through a desired amount of angle rotation, the x and the z axes defining an x-z plane, the method comprising the steps of:

rotating the spacecraft to point the sun sensor at the sun;

aligning the z axis with the sun by further rotation of the spacecraft;

rotating the y axis of the spacecraft to bring the magnitude of an included angle between the spacecraft z axis and the sun line to equal the magnitude of an included angle between the earth vector and the sun line;

spinning the spacecraft about the sun line vector;

acquiring the earth via a scanning by the earth sensor field of view during said spinning step for pointing the z axis at the earth; and gyrocompassing the spacecraft to orient the x and the y axes in desired directions.

2. A method of orienting a spacecraft relative to the earth during an orbiting of the earth by the spacecraft, the spacecraft being describable in terms of a local coordinate system having an x axis and a y axis and a z axis which are mutually perpendicular, the positive direction of the z axis facing the earth upon completion of an orientation of the spacecraft, the spacecraft having an earth sensor facing in the positive z direction, wherein the x axis is the roll axis and the y axis is the pitch axis, the spacecraft carrying a gyro sensor assembly outputting angle increment during a rotation of the spacecraft and enabling an inertial rotation of the spacecraft through a desired amount of angle rotation, the x and the z axes defining an x-z plane, the spacecraft carrying at least one TC antenna having a beam directed along the z axis, the TC antenna having a continuous field of view greater than a semicircle, the method comprising the steps of:

terminating rotational motion of the spacecraft;

rolling the spacecraft about the x axis;

sighting the earth during said rolling step by use of said at least one antenna;

observing a history of signal strength received by said at least one antenna during said rolling step to obtain an earth location coordinate in the x-z plane at a specific value of roll angle, said history being provided in terms of spacecraft roll angle provided by the gyro sensor assembly;

continuing said rolling step to provide for an orienting of the spacecraft at the specific roll angle;

pitching the spacecraft about the y axis;

sighting the earth during said pitching step by use of said at least one antenna;

observing a history of signal strength received by said at least one antenna during said pitching step to obtain an earth location coordinate in the y-z plane at a specific value of pitch angle, said history being provided in terms of spacecraft pitch angle provided by the gyro sensor assembly;

continuing said pitching step to provide for an orienting of the spacecraft at the specific pitch angle;

acquiring the earth via a scanning by the earth sensor field of view during at least one of said rolling and said pitching steps for pointing the z axis at the earth; and gyrocompassing the spacecraft to orient the x and the y axes in desired directions.

3. A method of orienting a spacecraft relative to the earth during an orbiting of the earth by the spacecraft, the spacecraft carrying a gyro sensor assembly outputting angle increment during a rotation of the spacecraft and enabling a gyrocompassing of the spacecraft through a desired amount of rotation, the spacecraft having an earth sensor and an electromagnetic antenna, a viewing direction of the earth sensor and a boresight direction of the antenna lying in a first plane perpendicular to an axis of the spacecraft, the method comprising the steps of:

terminating rotational motion of the spacecraft;

rotating the spacecraft about said spacecraft axis;

sighting the earth during said rotating step by use of said antenna;

observing a first history of signal strength received by said antenna during said rotating step to obtain an earth location coordinate in said first plane at a specific value of first rotational angle of the spacecraft, said first history being provided in terms of the first rotational angle of the spacecraft by the gyro sensor assembly;

continuing said rotating step to orient the spacecraft at the specific value of the first rotational angle;

reorienting the spacecraft by rotation of the spacecraft through a second rotational angle about a rotational axis mutually perpendicular to said spacecraft axis and the antenna boresight direction;

sighting the earth during said reorienting step by use of said antenna;

observing a second history of signal strength received by said antenna during said reorienting step to obtain an earth location coordinate at a specific value of the second rotational angle in a second plane containing said spacecraft axis and the antenna boresight direction, said second history being provided in terms of the second rotational angle of the spacecraft by the gyro sensor assembly;

continuing said reorienting step to provide for an orienting of the spacecraft at the specific value of the second rotational angle;

acquiring the earth via a scanning by the earth sensor field of view during at least one of said rotating and said reorienting steps for pointing the earth sensor at the earth; and gyrocompassing the spacecraft about a viewing axis of the earth sensor to obtain a desired orientation of the spacecraft.

4. A method according to claim 3 wherein said spacecraft carries a sun sensor having a viewing axis coincident with said spacecraft axis, and wherein said method comprises a further step, prior to said rotating step of orienting the spacecraft to point the sun sensor at the sun.

* * * * *